US008856052B2

(12) United States Patent
Chenthamarakshan et al.

(10) Patent No.: US 8,856,052 B2
(45) Date of Patent: *Oct. 7, 2014

(54) SYSTEM AND METHOD FOR DOMAIN ADAPTION WITH PARTIAL OBSERVATION

(75) Inventors: Vijil E. Chenthamarakshan, Kerala (IN); Richard D. Lawrence, Ridgefield, CT (US); Yan Liu, Elmsford, NY (US); Dan Zhang, West Lafayette, IN (US)

(73) Assignee: International Business Machines Corporation, Armonk, NY (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/618,603

(22) Filed: Sep. 14, 2012

(65) Prior Publication Data
US 2013/0013539 A1 Jan. 10, 2013

Related U.S. Application Data

(63) Continuation of application No. 13/006,245, filed on Jan. 13, 2011.

(51) Int. Cl.
*G06F 15/18* (2006.01)
(52) U.S. Cl.
USPC .......................................................... 706/12
(58) Field of Classification Search
None
See application file for complete search history.

(56) References Cited

U.S. PATENT DOCUMENTS

2008/0270120 A1 10/2008 Pestian et al.
2009/0083332 A1* 3/2009 Datta et al. ................. 707/104.1
2011/0071965 A1* 3/2011 Long et al. ...................... 706/12

OTHER PUBLICATIONS

Arnold et al, Intra-document Structural Frequency Features for Semi-supervised Domain Adaptation, 2008.*
Kaufmann et al, Syntactic Normalization of Twitter Messages, Jul. 2010.*
Zhang et al, ALPOS: A Machine Learning Approach for Analyzing Microblogging Data, 2010.*
Duda et al., "Pattern Classification", Wiley-Interscience, ISBN 0-471-05669-3, pp. 16-17.
Higham, Accuracy and Stability of Numerical Algorithms: Society for Industrial and Applied Mathematics, ISBN-10: 0-89871-521-0, 2002, p. 258.
Quanz et al., "Large Margin Transductive Transfer Learning", CIKM'09, Nov. 2-6, 2009, Hong Kong, China ACM 978-1-60558-512-3/3/09/11.
Raina et al., "Self-taught Learning: Transfer Learning from Unlabeled Data", Proceedings of the 24th International Conference on Machine Learning ACM, 2007, p. 766.

(Continued)

*Primary Examiner* — Jeffrey A Gaffin
*Assistant Examiner* — Mikayla Chubb
(74) *Attorney, Agent, or Firm* — Scully, Scott, Murphy & Presser, P.C.; Daniel P. Morris, Esq.

(57) ABSTRACT

A novel domain adaption/transfer learning method applied to the problem of classifying abbreviated documents, e.g., short text messages, instant messages, tweets. The method uses a large number of multi-labeled examples (source domain) to improve the learning on the partial observations (target domain). Specifically, a hidden, higher-level abstraction space is learned that is meaningful for the multi-labeled examples in the source domain. This is done by simultaneously minimizing the document reconstruction error and the error in a classification model learned in the hidden space using known labels from the source domain. The partial observations in the target space are then mapped to the same hidden space, and classified into the label space determined by the source domain.

10 Claims, 9 Drawing Sheets

(56) References Cited

OTHER PUBLICATIONS

Scholkopf et al., "Learning with Kernels", 2002 Massachusetts Institute of Technology, Library of Congress Control No. 2001095750.
Tang et al., "SVMs Modeling for Highly Imbalanced Classification", Journal of Latex Class Files, vol. 1, No. 11, Nov. 2002, pp. 1-9.
"Test Collections Reuters-21578", www.daviddlewis.com/resources/testcollections/reuters, Dec. 9, 2010.
Pan et al., "Transferring Localization Models Across Space", Twenty-Third AAAI Conference on Artificial Intelligence (AAAI-08), Chicago, IL, Jul. 13-17, 2008, pp. 1383-1388.
Blitzer et al., "Biofraphies, Bollywood, Boom-boxes and Blenders: Domain Adaptation for Sentiment Classification", Proceedings of the 45th Annual Meeting of the Association of Computational Linguistics, Prague, Czech Republic, Jun. 2007, pp. 440-447.

\* cited by examiner

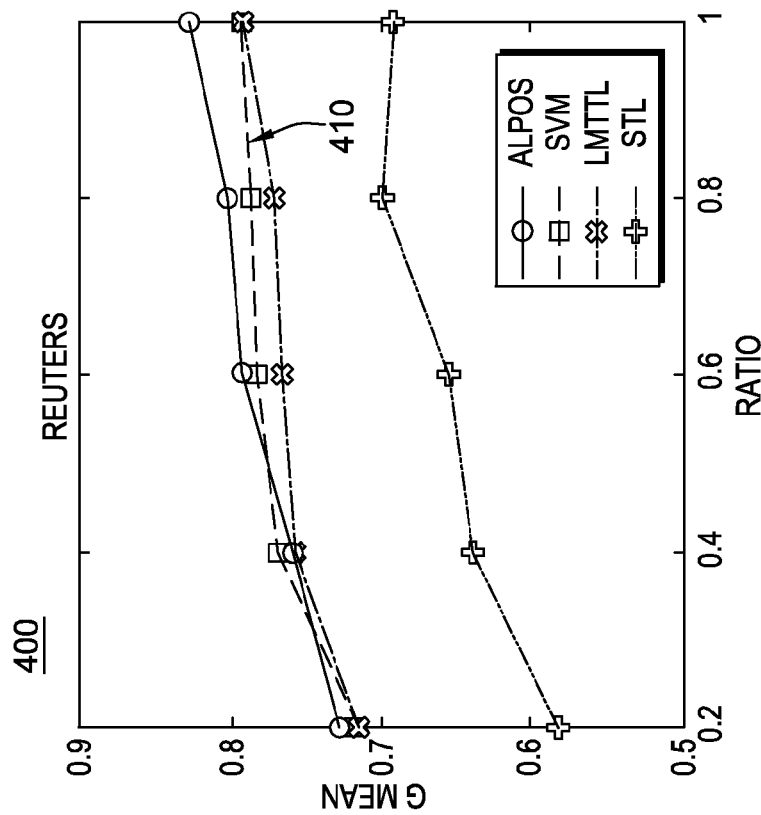
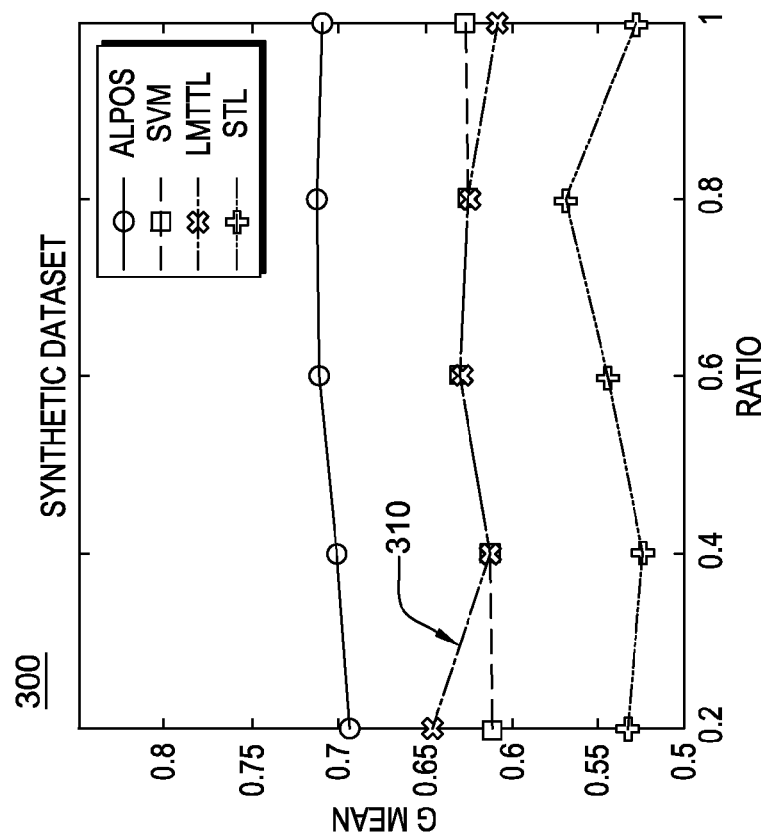
FIG. 4B
FIG. 4A

| TWEETS | TAGS |
|---|---|
| IBM LOTUS SAMETIME GATEWAY ALERT: NEW INBOUND TALKZ..! | GUIDANCE, ACCESS, TECHNIC, WORKPLACE, DIAGNOSTICS |
| GENERAL OTHER SPECIALTY SALES AT IBM (WASHINGTON, DC): DATA MANAGEMENT SALES SPECIALIST | COMPUTER, SOFTWARE, SELL, RATIONAL |
| GRAPHIC DESIGN JOB - STUDENT/INTERN - IBM - SOMERS, CT: 2 YEAR EXPERIENCE IN GRAPHIC DESIGN ENGLISH: FLUENT..R.... | COMPUTER, AVAILABLE, CAPABILITY, IBMINTERN |
| IBM PLANS ONLINE APOS;SERIOUS APOS; SIMCITY-STYLE URBAN-SPRAWL SIM, CITYONE (INFORMATIONWEEK); | COMPUTER, TODO, TOOLBAR,DIAGRAM, RECOMMEND,TIME,BRAND |
| IBM PERSPECTIVE ON CLOUD COMPUTING | ASSESS, BRIEF,INTRODUCTION, USAGE,OPERATION |
| HIRING A SYSTEMS ADMINISTRATOR AT IBM (WASHINGTON, DC) #JOBS #SHJOBS | FIND, EXPERTIS, FIREWALL, SITE, |
| THE BPMNETWORK: #BPM #CAREERS LOMBARDI BUSINESS PROCESS MANAGEMENT (BPM) CONSULTANT -IBM-UNITED STATES | TECHNIC, WEBSERVICE, FUNCTION, WEBSPHERE |
| INFORMATION DEVELOPER AT IBM (WASHINGTON, DC): THIS IS AN INTERNSHIP POSITION AND ALL | TECHNIC,COMPUTER,ENABLE, SOFTWARE, US |
| IBM: ACCOUNT MANAGER (LOS ANGELES, CA) | CHAT, WORKPLACE, ROLE, ACCOUNT |
| IBM TO PARTICIPATE IN THE TRANSPORTATION SECURITY FORUM NEXT WEEK (MAY 3-4), VISIT US IN BOOTH #A07! | TECHNIC, WORKSHOP, EXPORT, FUNCTION, TIME |
| IBM PRESENTS, SYSTEM X3650 M2 | ENABLE, DESIGN,COMPUTER, SETUP |
| STUPID IBM SOFTWARE UPDATE TOOL!! | ESSENTIAL,INFORM, IBM, LOTUS,SETUP |

FIG. 5

| CLUSTER INTERPRETATION | CLUSTER TAGS |
|---|---|
| SOFTWARE DEVELOPMENT | 'PRACTITION' 'SOLUTION' 'HUB' 'DASHBOARD' 'ISO' 'AGILE' 'FIREWALL' 'USER' 'CONFIGURE' |
| IBM SOFTWARE CONFERENCES | 'CONFERENCE' 'TECHNIC' 'RATIONAL' 'IM' 'CHART' 'LOTUSPHERE' 'SOFTWARE' 'INFOSPHERE' 'COE' (CENTER OF EXCELLENCE) |
| LOTUS PRODUCTS | 'WEBCONFERENCE' 'ASSIST' 'SYMPHONY' 'PILOT' 'LOTUS NOTES' 'QUICKR' 'SKILL' |
| INSTANT MESSAGING TOOLS | 'WORKPLACE' 'IM' 'ROLE' 'CHAT' 'AUDIO' |
| SOFTWARE SALES | 'DOMINO' 'UK' 'NATIONAL' 'SELF' 'SUT' (SAMETIME UNIFIED TELEPHONY) |
| BUSINESS ENGAGEMENTS | 'COP' (COMMUNITIES OF PRACTICE) 'UI' 'ENGAGEMENT' 'IM' 'BUSINESS' 'PRACTITION' |
| WEBCONFERENCE SOFTWARE | 'READER' 'QUICK' 'COMPUTER' 'WEBCONFERENCE' 'RECORD' 'FREE' |
| SOCIAL SOFTWARE | 'COMMUNICATION' 'SOCIALSOFTWARE' 'FAVORITE' 'AGGREGATE' 'MOBIL' 'W3KI' |

SYSTEM AND METHOD FOR DOMAIN ADAPTION WITH PARTIAL OBSERVATION

CROSS REFERENCE TO RELATED APPLICATION

The present invention claims the benefit of U.S. patent application Ser. No. 13/006,245 filed Jan. 13, 2011, the entire content and disclosure of which is incorporated herein by reference.

The present disclosure relates generally to methods and techniques for assisted learning for partial observation and text classification.

BACKGROUND

Micro-blogging services, such as Twitter (http://twitter.com/), allow users to post short messages, e.g., "tweets", so that they can share information on a broad range of subjects including personal updates, fast-breaking news, politics, entertainment, or just about anything else that people might discuss in everyday conversation. At least 50M tweets are posted each day. Due to its real-time property, it is of great interest to track trending ("hot") topics in Twitter. However, given the massive number of tweets per day and their unique characteristics, there is a need to provide sophisticated information filtering algorithms to better understand the topics underlying these huge amount of tweets.

The major challenge for twitter understanding is that the number of characters in each tweet is highly limited, and abbreviated syntax is often introduced by users for convenience. Another challenge is the lack of reliable training labels. Fortunately, there are a large number of related information sources, such as Wikipedia (http://www.wikipedia.org/) and social tagging, which contain long documents, and may include tags/labels that carry additional insights about each document. A natural question is whether the model learned in this enriched source domain can be used to help to understand the abbreviated documents (tweets) in the target domain.

The problem is generalized as learning from partial observations.

For example, in text classification, it is often needed to deal with the problem of partial observations, where a significant number of word features are missing for each document. This can be a result of enforced limits on document length, as in twitter, or due to privacy concerns or confidentiality issues, which might limit the availability of email content. Learning from partial observations remains an extremely challenging task.

Traditional transfer learning approaches often involve learning a classification model in the source domain, using bag-of-words features, and then 'transfer' this model to the target domain. Such an approach is more likely to be effective when documents in the target domain are of comparable length and information content.

Existing domain adaptation methods are basically based on motivations that deal with the distribution difference between a source domain and the target domain, where this difference is actually induced by change in location (e.g., as in a Wi-Fi application), change in subject (as in a sentiment classification), etc. However, none of these methods can be generalized to deal with the distribution difference caused by missing word features, since they all assume that there is essentially no missing features in the target domain documents. One example implementation of a self-taught learning technique as taught in R. Raina, A. Battle, H. Lee, B. Packer, and A. Y. Ng entitled "Selftaught learning: Transfer Learning from Unlabeled Data" in *Proceedings of the 24th international conference on Machine learning*, page 766, ACM, 2007, incorporated by reference herein, is deficient in that when building a bases from the source domain documents, self-taught learning cannot use the label information to generate a set of more meaningful bases; further self-taught learning cannot be used to solve the partial observation problem either, although they also transfer the knowledge between two domains through a set of bases. [Pan et al. AAAI 2008] S. J. Pan, D. Shen, Q.

It would be highly desirable to provide the ability to reconstruct these partially observed documents by mapping them to a set of bases learned from some relevant labeled documents in other sources.

SUMMARY

It would be desirable to solve this problem by using another large set of relevant labeled documents.

The main contribution of the disclosure is to reconstruct these partially observed documents by mapping them to a set of bases learned from some relevant labeled documents in other sources.

Accordingly, there is provided a system, method and computer program product for processing documents, the method comprising: constructing, via a programmed processor device, a hidden feature space from one or more text document examples of a source domain, the one or more text document examples tagged with one or more labels of a source domain label space; and, simultaneously training one or more classifiers for use in classifying text documents, the classifiers trained on the one or more text document examples and the hidden feature space; receiving, at the processor device, one or more partially observed text document examples from a target domain; reconstructing, at the processor device, the partially observed text document examples of the target domain based on the constructed hidden feature space; and, predicting the labels of the partially observed text document examples based on the reconstructed target domain text document examples and the one or more trained classifiers.

Further to this aspect, the trained one or more classifiers classify the partial observations text document examples into the label space determined from the source domain.

Further, there is performed learning a classification model from the hidden feature space.

Moreover, further to this aspect, the constructing comprises: determining, from the source domain, a set of bases for reconstructing the partially observed text document examples; and, determining a set of classifiers for classifying the reconstructed partially observed text document examples.

A computer program product is provided for performing operations. The computer program product includes a storage medium readable by a processing circuit and storing instructions run by the processing circuit for running a method. The method is the same as listed above.

BRIEF DESCRIPTION OF THE DRAWINGS

The objects, features and advantages of the present invention will become apparent to one skilled in the art, in view of the following detailed description taken in combination with the attached drawings, in which:

FIGS. 4A and 4B depict example comparison results of the performance of different algorithms implemented in solving two different example datasets, e.g., a Synthetic Dataset 300 in FIG. 4A and a Reuters21578 dataset 400 in FIG. 4B with varying number of source domain examples;

FIG. 5 shows example classification results as a Table 500 for several randomly selected tweets including their top ranked tags with the soft labels (i.e., hidden topics) indicated, in one embodiment;

FIG. 6 depicts a Table 600 reporting showing result of clustering and classifying results of example tweets according to the embodiments described herein; and, FIG. 7 illustrates an exemplary hardware configuration for implementing the method in one embodiment.

DETAILED DESCRIPTION

Figure 1A:
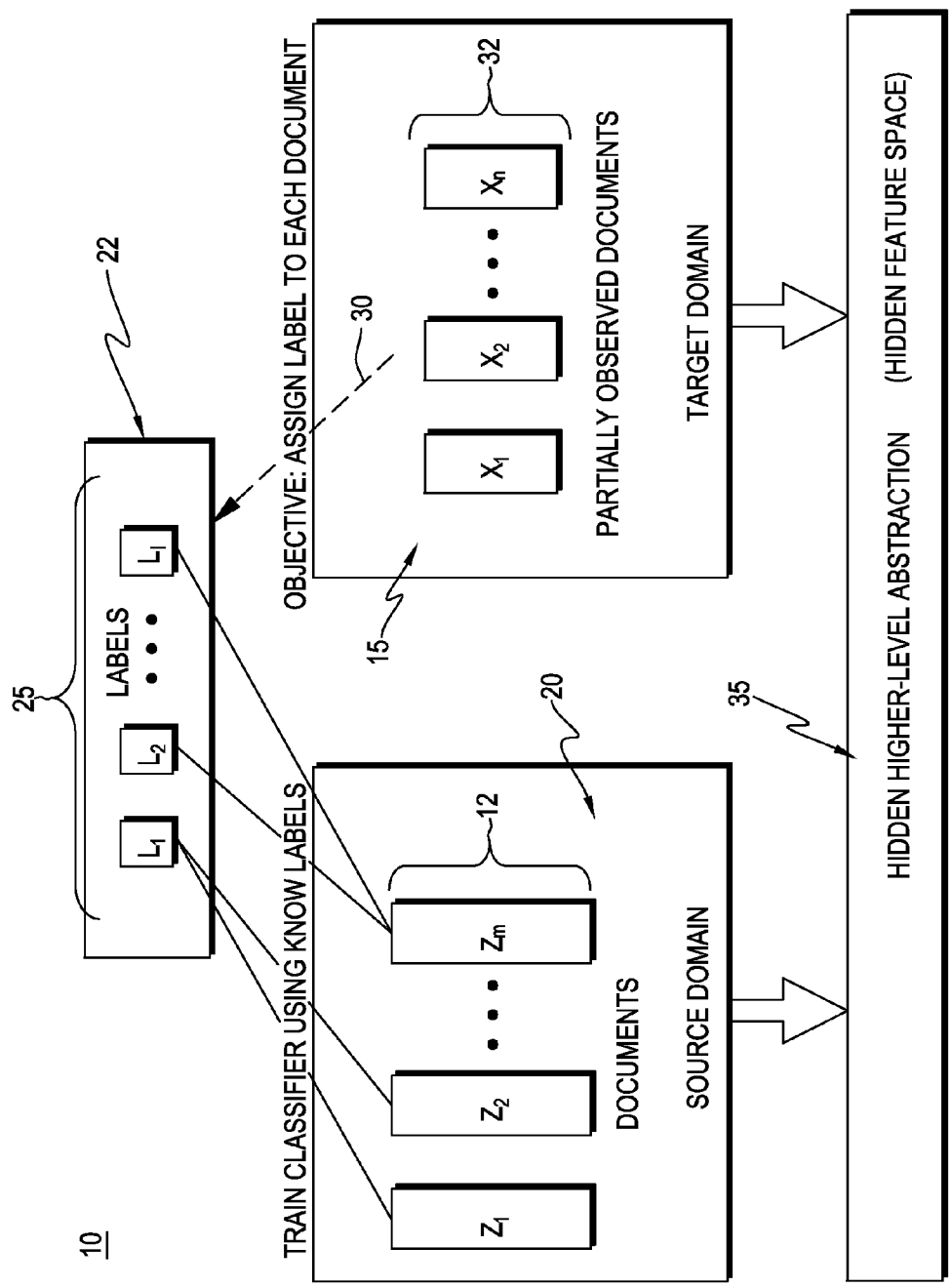
FIG. 1A is an example high-level view of a processing framework 10 for classifying partially-observed documents 32 in a target domain 15 into the label space available from a source domain 20

In one aspect, FIG. 1A provides a high-level view of a processing framework 10 referred to as "Assisted Learning for Partial Observation" (ALPOS) that classifies partially-observed documents 12 in a target domain 15 into the label space available from a source domain 20. The classification results can be used to either filter documents in the target domain, or to extract trending topics.

From a perspective of machine learning, ALPOS performs a form of domain adaption/transfer learning, since it transfers knowledge from the labeled examples in the source domain 20 to the unlabeled ones in the target domain 15.

Figure 1B:
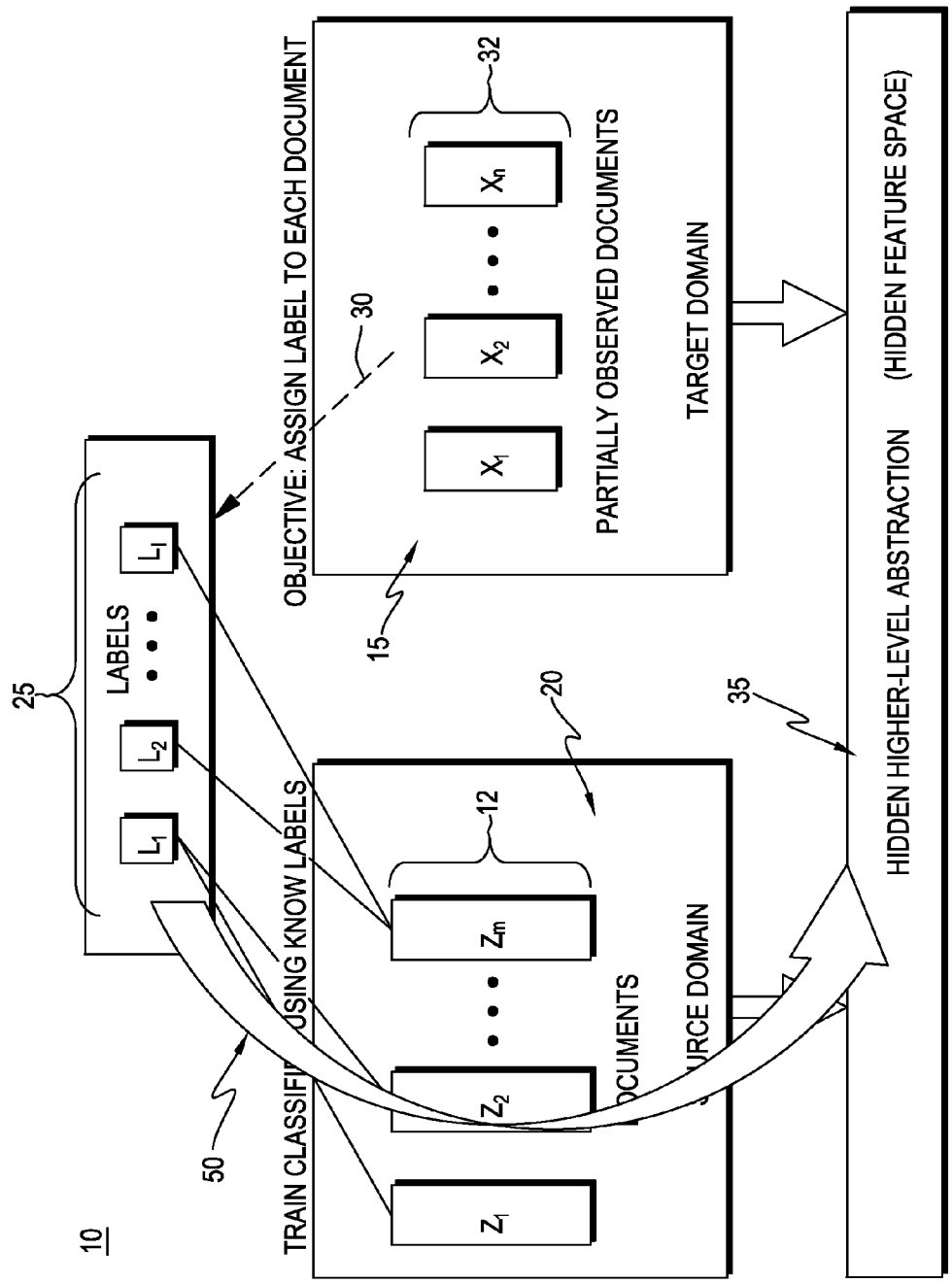
FIGS. 1B-1C depicts the system and method for mimicking human understanding by producing a hidden, higher-level abstraction space 35 for use in classifying partially-observed documents 32 of the target domain 15.
Figure 1C:
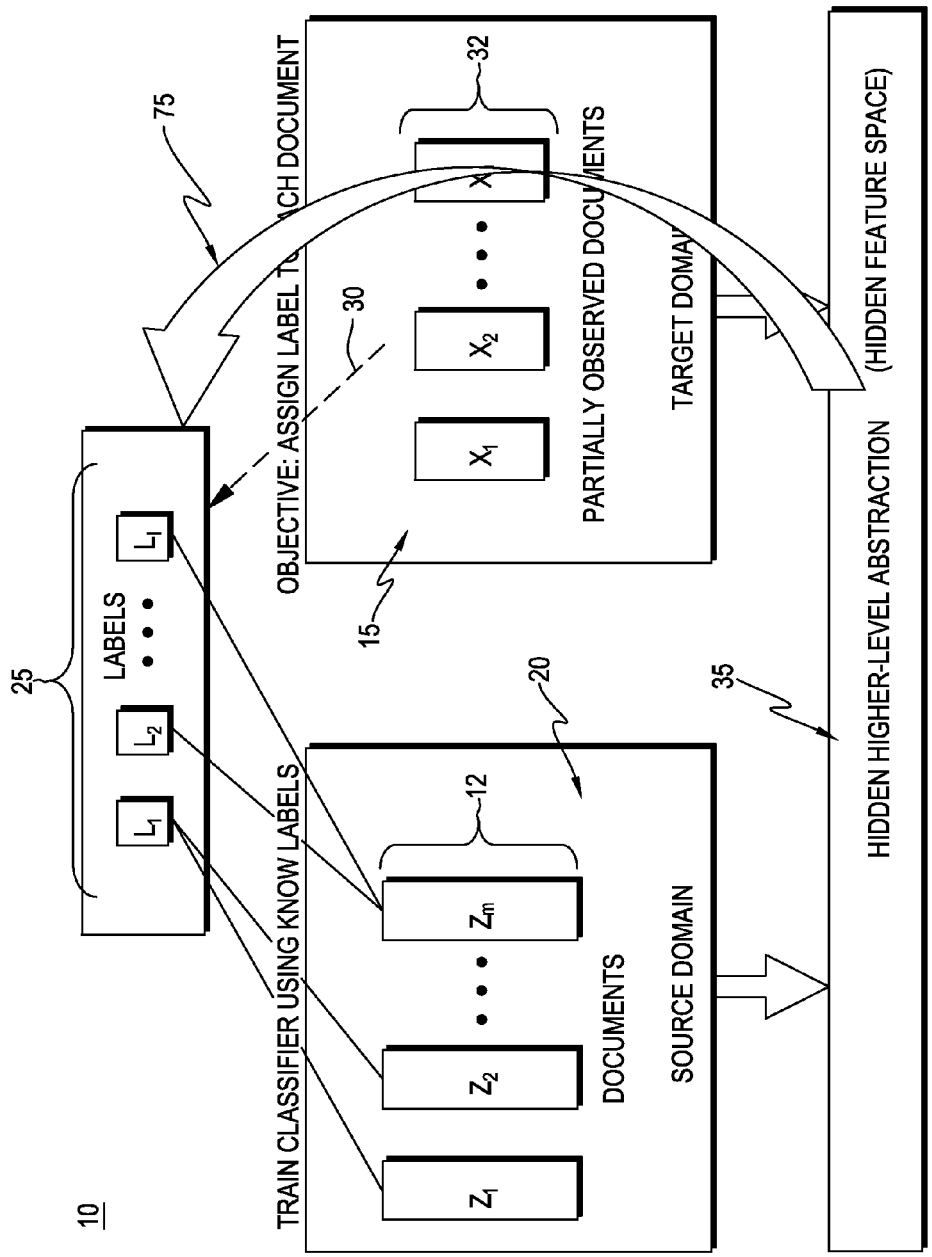

Given an objective of classifying abbreviated (partially observed) documents, the ALPOS framework 10 of FIGS. 1A-1C seeks to mimic human understanding by producing a hidden, higher-level abstraction space 35 that is assumed to be shared by both the source domain 20 and the target domain 15 even though there is only obtained a partial view of the target documents that map to this hidden space.

In one embodiment of the ALPOS framework shown in FIG. 1A, there are provided enough multi-labeled examples (e.g., documents) $z_1, z_2, \ldots, z_m$ 12 in source domain 20, and a number of partially observed examples, e.g., documents $x_1, x_2, \ldots, x_n$ in the target domain 15. For example, the documents 12 in the source domain may include Wikipedia® [Trademark of Wikimedia Foundation, Inc.] articles, and the partial observations in the target domain 15 could be message or text items of short length, e.g., less than 140 characters. In one example these short text messages may include a short message type known as a Tweet™ (Twitter, Inc.) 32. Each document 12 in the source domain 20 is tagged with one or more labels 25 of label space 22, and it is assumed that this label space 22 covers the unobserved labels in the target domain.

Given an objective of classifying abbreviated (partially observed) documents, it is sought to mimic human understanding by introducing a hidden, higher-level abstraction 35 that is assumed to be shared by both the source domain and the target domain. However, there is only a partial view of the target documents that map to this hidden space.

Generally, the methodology consists of two stages. First, in the source domain 20, a basis set is constructed (learned) using the available labels. As discussed below, this basis set is constructed to simultaneously provide the best reconstruction of the source documents, and minimize the error in predicting the known labels. Second, once the bases are obtained, the examples in the target domain 15 are mapped to these bases, and the model learned in the source domain is used to generate labels 30 for the unlabeled target documents, e.g., tweets. Thus, "reconstruction" includes re-representing the examples in the target domain (tweets) by analyzing some useful information from the rich source domain (source domain) so that the content of tweets can be enriched.

Thus, a set of bases learned in the first step represents meaningful feature combinations for the multi-labeled examples 12. Thus, the mapping step is alternately considered as a feature reconstruction step for the partially observed target domain examples 32, since this reconstruction is based on the meaningful bases of the source domain 20, and the source domain examples contain abundant information.

Thus, in view of FIG. 1A, there is input to the framework 10 a partially observed dataset $\{x_1, x_2, \ldots, x_n\} \in X$ as the target domain 15, as well as m examples $(z_1,y_1), (z_2,y_2), \ldots, (z_m,y_m)\} \in \{X, Y\}$ in the source domain 20. X is a d-dimensional space, and Y denotes the label space 22. Without loss of generality, it is assumed that different labels in the label space are mutually independent, and each $y_i$ can be considered as an l-dimensional label vector, as in multi-label learning problems, with $y_{ij} \in \{0,1\}$ and "l" being the number of binary labels in the label space. In one aspect, ALPOS framework 10 performs predicting the labels for $\{x_1, x_2, \ldots, x_n\}$ on the target domain, i.e., $\{y_1^t, y_2^t, \ldots, y_n^t\} \in Y$.

In one embodiment, a method and computer program product includes instructions executed by a host or processor system to: 1) generate "higher" level base representations; and 2) reconstruct the target domain.

With respect to 1) generating higher" level base representations, the multi-labeled examples in the source domain 20 are used to learn a higher level, more succinct representation of the inputs. For example, if both the source domain 20 and target domain 15 are text documents and each feature represents a specific word, the method learns a set of different word combinations that can include all of these documents in the source domain, and are consistent with their labels. Then, as shown in FIG. 1B, the framework 10 discovers the best higher level representation on the source domain that can optimally perform both the classification and the feature reconstruction tasks. Information 50 of this higher level representation is passed from the labeled documents to the hidden higher-level abstraction layer 35. As will be described in greater detail with respect to FIGS. 2 and 3, the method includes setting up and solving an optimization problem, to simultaneously minimize the document reconstruction error and the error in a classification model learned in the hidden space 35 using known labels 25 from the source domain 20.

With respect to: 2) reconstructing target domain example, the method represents the examples in the target domain in terms of the bases obtained. For the partial observation problem, in one embodiment, for each target domain example, the non-zero features are considered for reconstruction. Thus, as shown in FIG. 1C, the examples in the target domain are unlabeled partial observations and this the "lost" part is recovered by minimizing the reconstruction error induced by mapping the nonzero part of the target domain examples 32 to the corresponding part of the learned bases. In FIG. 1C, this mapping information 75 is passed from the hidden higher-level abstraction layer 35 to the partially observed documents 32. The classifying of the target domain examples is then performed by using the reconstructed target domain examples and the classifiers learned in the source domain.

FIG. 2 is a flow chart depicting operation of a method 100 implemented by the ALPOS framework 10 for Domain Adaptation with Partial Observation. FIG. 2 particularly shows, at 103, the input of the data sources used in ALPOS that includes: the Source Domain Examples: $\{(z_1,y_1), (z_2,y_2), \ldots, (z_m,y_m)\}$; the Target Domain Examples: $\{x_1, x_2, \ldots, x_n\}$ and various parameters utilized in the optimization formulation.

With respect to the higher level representation, ALPOS computing framework 10 and method 100 includes formulating an optimization problem according to Equation 1) as follows:

$$\min_{W,b,A,\varphi} C_1 \sum_{i=1}^{m} (\|z_i - \varphi a_i\|^2 + \beta\|a_i\|_1) + \qquad (1)$$

$$\frac{1}{2}\sum_{j=1}^{l}\|w_j\|^2 + C_2\sum_{i=1}^{m}\sum_{j=1}^{l}\delta(i,j)\epsilon_{ij}$$

s.t. $\forall i \in \{1, \ldots, m\}, \forall j \in \{1, \ldots, l\}$ $y_{ij}(w_j^T a_i + b_j) \geq 1 - \epsilon_{ij}, \epsilon_{ij} \geq 0$ $\forall i \in \{1, \ldots, s\}, \|\varphi_i\|_2 \leq 1$ As shown in the equation 1), there are in total four sets of variables that need to be optimized in this optimization formulation. $\varphi \in R^{d \times s}$ is a s-dimensional hidden space 35 underlying both the source 20 and target 15 domains. $A=[a_1, a_2, \ldots, a_m]$ are the activation coefficients for $[z_1, z_2, \ldots, z_m]$ in this hidden feature space 35. Activation coefficients, A, in the ALPOS method refers to the vectors that the classifiers are directly trained or used to predict. A set of multi-label classifiers $W=[w_1, w_2, \ldots, w_l]$ is trained based on A, where $b=[b_1, b_2, \ldots, b_l]$ represents the corresponding biases. The optimization problem of Eq. 1) can be divided into two parts, the reconstruction part:

$$C_1 \sum_{i=1}^{m}(\|z_i - \varphi a_i\|^2 + \beta\|a_i\|_1)$$

and the supervision part (e.g., classifier learning):

$$\frac{1}{2}\sum_{j=1}^{l}\|w_j\|^2 + C_2\sum_{i=1}^{m}\sum_{j=1}^{l}\delta(i,j)\epsilon_{ij}.$$

where C1, C2 are trade-off parameters tuning the values of these two parts, $\beta$ is the regularization parameter for the reconstruction part, and, $\delta(i,j)$ is an indication function, and, in one embodiment, equals 1 if the j-th example is selected for training the i-th classifier, and otherwise 0. This function is provided to address any class imbalance problem.

Figure 2A:
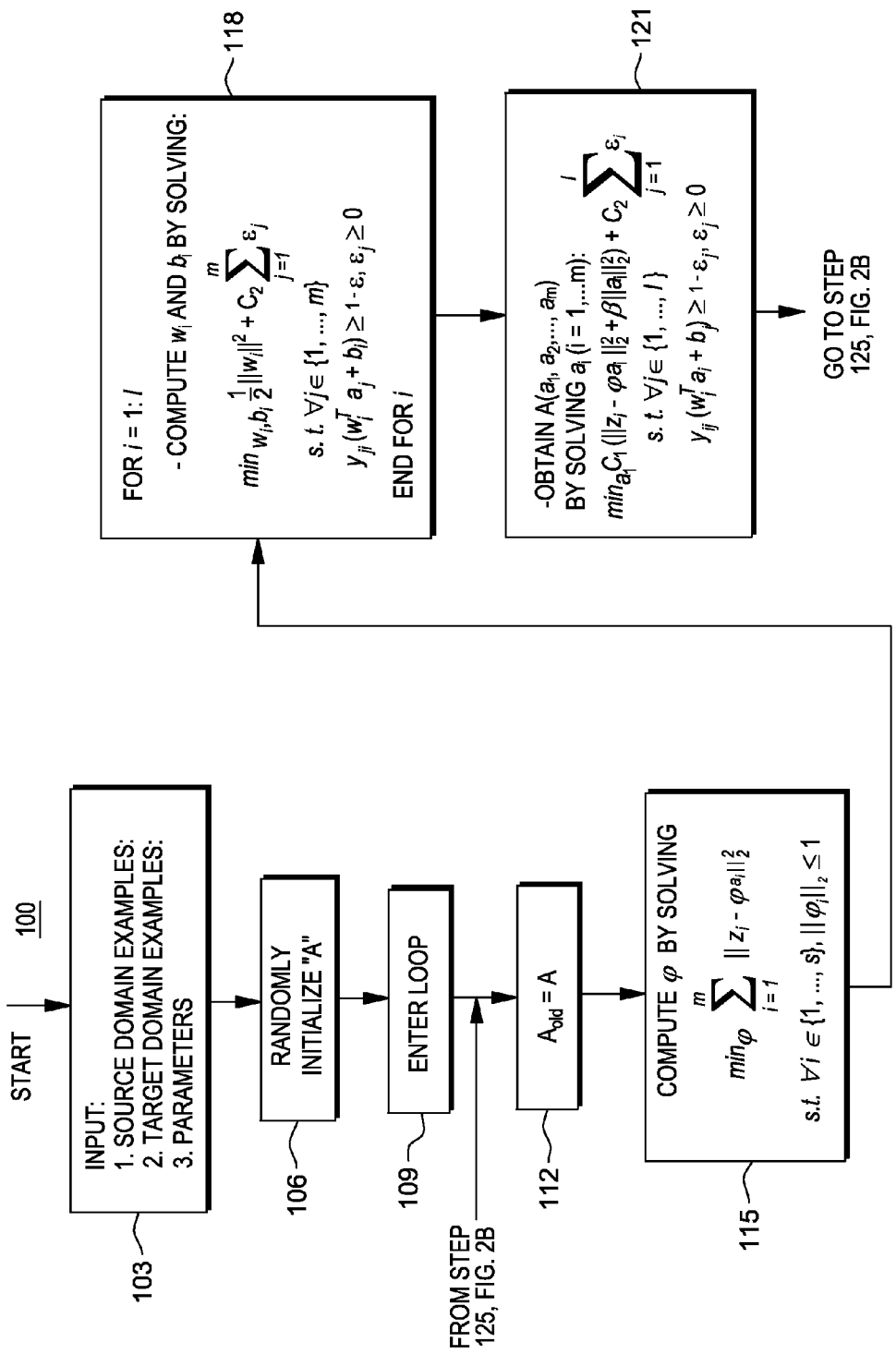
FIGS. 2A and 2B are a flow chart depicting a methodology 100 for classifying partially-observed documents 32 in a target domain 15 as shown in FIG. 1A according to one embodiment.
Figure 2B:
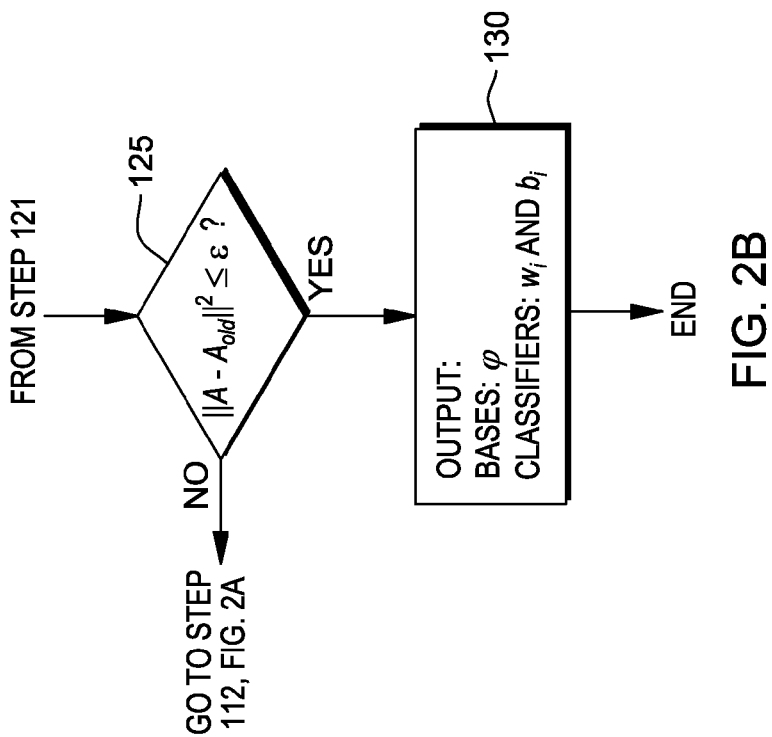

Thus, in view of FIG. 2A, the parameter values input to the ALPOS computation framework at 103 at least include, but are not limited to: $C_1, C_2, \beta$, as in Eq. (1), the dimension of hidden space s, and a precision parameter $\epsilon$ having, for example, a value $\epsilon=0.01$.

In FIG. 2A, continuing at 106, there may be first performed an initialization of the $A=[a_1, a_2, \ldots, a_m]$ activation coefficients for $[z_1, z_2, \ldots, z_m]$ in this hidden space 35. In one example, these initialized coefficients may be a randomly generated.

Continuing at 109, a convergence loop is entered that begins processing of the inputs to compute activation coefficients in a manner that ensures the activation coefficients are optimized. Continuing at 112, the initialized activation coefficients values $A=[a_1, a_2, \ldots, a_m]$ are assigned to a data structure $A_{old}$. After each iteration within the convergence loop, upon a determination that the most recent computed activation coefficients $A=[a_1, a_2, \ldots, a_m]$ have not been optimized, i.e., the resulting activation coefficient processing error terms are still above a pre-determined precision threshold (value $\epsilon$), those most recent values of the $A=[a_1, a_2, \ldots, a_m]$ are assigned as $A_{old}$ values and the process proceeds to step 115.

At 115, there is performed computing the $\varphi$ of the s-dimensional hidden space 35 underlying both the source 20 and target 15 domains. In one embodiment, shown in FIG. 2A, this is calculated by solving, using a programmed computer or processor device, the reconstruction part, i.e., minimizing:

$$C_1 \sum_{i=1}^{m}(\|z_i - \varphi a_i\|^2 + \beta\|a_i\|_1)$$

s.t. $\forall i \in \{1, \ldots, s\}, \|\varphi_i\|_2 \leq 1$

Continuing at 118, an iterative procedure is performed (e.g., FOR-DO or WHILE-DO loop is entered) to a classification loss function, i.e., compute $w_i$ and $b_i$ values. The loop iterates the index i between values $1, \ldots, l$. The computing of $w_i$ (classifier) and $b_i$ (bias) values includes solving the supervising part:

$$\frac{1}{2}\sum_{j=1}^{l}\|w_j\|^2 + C_2\sum_{i=1}^{m}\sum_{j=1}^{l}\delta(i,j)\epsilon_{ij}$$

s.t. $\forall i \in \{1, \ldots, m\}, \forall j \in \{1, \ldots, l\}$ $y_{ij}(w_j^T a_i + b_j) \geq 1 - \epsilon_{ij}, \epsilon_{ij} \geq 0$ $\forall i \in \{1, \ldots, s\}, \|\varphi_i\|_2 \leq 1$ Then, continuing at 121, there is computed updated activation coefficients $A=[a_1, a_2, \ldots, a_m]$ (i.e., A values), by solving:

$$\min_{a_i} C_1(\|z_i - \varphi a_i\|_2^2 + \beta\|a_i\|_2^2) + C_2\sum_{j=1}^{l}\epsilon_j$$

s.t. $\forall j \in \{1, \ldots, l\}$ $y_{ij}(w_j^T a_i + b_j) \geq 1 - \epsilon_j, \epsilon_j \geq 0$ Then, continuing at 125, FIG. 2B, a determination is made as to whether the computed activation coefficients $A=[a_1, a_2, \ldots, a_m]$ (i.e., A values), are optimized. This may include determining whether a difference (squared) between the most recently obtained A values and the most recent assigned A values ($A_{old}$ values) is less than a precision parameter value $\epsilon$, i.e., indicating a convergance (and, hence indicating, the reconstruction error minimized). If, at 125, it is determined that the difference between the most recently obtained A values and the most recent assigned A values (data structure $A_{old}$) is greater than the precision parameter value $\epsilon$, indicating no convergence, then the process repeats by returning to step 112, FIG. 2A, to assign the most recently obtained A values to data structure $A_{old}$ values and repeating steps 115, 118, 121. This loop from 112 to 125 is a convergence loop, and will repeat until $\|A-A_{old}\|^2 \le \epsilon$ when, at such time, the bases φ of the s-dimensional hidden space 35 underlying both the source 20 and target 15 domains and the classifiers $w_i$ (classifier) and $b_i$ (bias) values are output at step 130, FIG. 2B.

In further embodiments, the same strategy is used to treat baseline methods such as Support Vector Machine (SVM), Large Margin Transductive Transfer Learning (LMTTL) and Self Taught Learning (STL) techniques. It is clear that the optimization problem formulation of equation 1) attempts to minimize the reconstruction error and the multi-label empirical risks of the classification loss function simultaneously. Although not joint convex, this optimization problem is convex in w, b, Φ (while holding A fixed), and convex in A (while holding W, b, Φ fixed). Therefore, in one aspect, the optimization problem formulated in eq. 1 is iteratively optimized by alternatively optimizing with respect to W, b, Φ and A.

Prior to the optimization solution performed, the examples in the target domain 15 are unlabeled and partially observed. If a multi-label classifier is trained directly on the source domain without the hidden space, and used to classify the examples in the target domain, the result may be badly affected, since the partially observed examples will not follow the same distribution as the one in the source domain. However, by reconstructing the partially observed examples in the target domain in the bases that have been learned previously in the source domain, the "lost" part of these examples can be regained.

Thus, in an example text mining application, a first step may include extracting features for each webpage/tweet, and each webpage/tweet is normally represented by one feature vector. Each feature element in the feature vector is directly related to the word frequency of a specific word in a vocabulary, as determined by a dataset (not shown). Since each webpage/tweet can not contain all of the words in the vocabulary, one or more of their features will be zero. As tweets are always very short text messages (e.g., less than 20 characters), thus, if features are extracted for tweets, it is highly possible that only a few words in the vocabulary will have values (non-zero parts), while the remaining ones are all zero (zero parts). In one aspect, these partially observed examples in the target domain are reconstructed according to the bases learned previously in the source domain, such that the "lost" part of these examples is regained.

In particular, reconstruction includes generating the new activations for $x_i$ can be computed according to equation 2) as follows:

$$c(x_i) = \mathrm{argmin}_a \|\tilde{x}_i - \tilde{\phi}a\|_2^2 + \beta\|a\|_2^2 \quad (2)$$

where $\tilde{x}_i$ is the non-zero part (non-zero features) for $x_i$ and $\tilde{\phi}$ represents the corresponding part of φ for the non-zero features of $x_i$. In one embodiment, this may be solved as a regularized least square problem, with the optimal solution shown in equation 3) as follows:

$$c(x_i) = (\tilde{\phi}^T\tilde{\phi}+\beta I)^{-1}\tilde{\phi}^T\tilde{x}_i \quad (3)$$

where $\tilde{\phi}^T$ is the transpose matrix of $\tilde{\phi}$, I is the identity matrix. Thus, activation coefficients in the method additionally refers to $c(x_i)$, i.e., the vectors that the classifiers are directly trained or used to predict. In one embodiment, $c(x_i)$ is solved by employing Woodbury inversion [See, for e.g., a reference to N. J. Higham entitled "Accuracy and Stability of Numerical Algorithms," Society for Industrial Mathematics, 2002, incorporated by reference herein], since the rank of $\tilde{\phi}^T\tilde{\phi}$ is very low. The non-zero part of $x_i$ is used for reconstruction as the examples in the target domain are just some partial observations; the zero features for $x_i$ imply nothing about the "original" values on these dimensions. It approximately expresses $x_i$ as a linear combination of the bases $\phi_i$ and this new representation $c(x_i)$ now serves as the new representation of $x_i$.

Further, these newly represented examples $c(x_i)$ can then be classified using the classifier W and b obtained in the prior steps. This is performed in a reconstruction step described with respect to FIG. 3.

Figure 3:
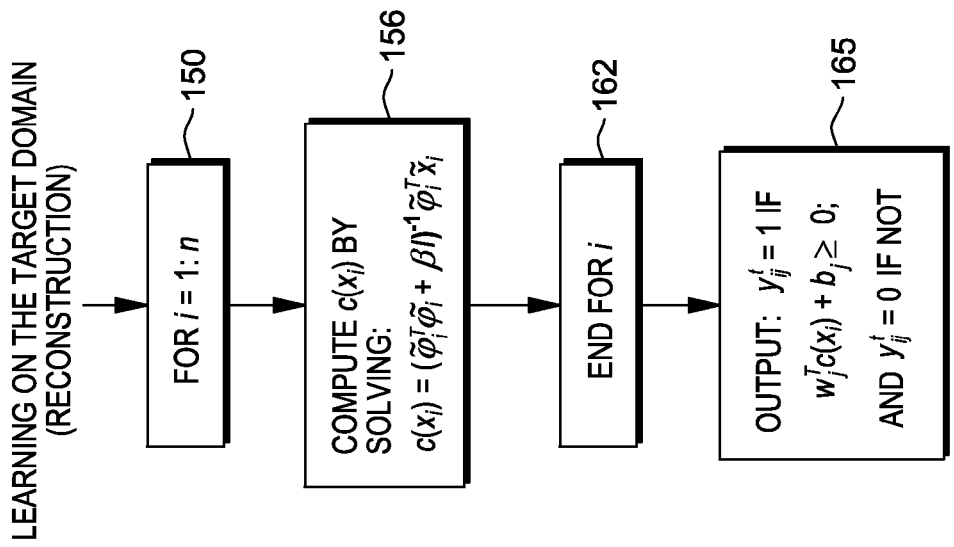
FIG. 3 depicts, in one embodiment, the learning on the Target Domain (i.e., target domain text document example reconstruction.

FIG. 3 depicts, in one embodiment, the learning on the Target Domain (i.e., reconstruction) including, entering a loop from 150 to 162 (e.g., a FOR-DO or WHILE-DO loop), that iterates across all the examples ("n") in the target domain, i.e., i is iterated from 1 to n, wherein at 156, the reconstructed target domain examples $c(x_i)$ are calculated according to equation 3), i.e. by solving $(\tilde{\phi}^T\tilde{\phi}+\beta I)^{-1}\tilde{\phi}^T\tilde{x}_i$. In this expression, $\tilde{x}_i$ and $\tilde{\phi}_i$ correspond to the non-zero part of example $x_i$.

Finally the method outputs at 165 the labels of the reconstructed target domain examples, i.e., $\{y_1^t, y_2^t, \ldots, y_n^t\}$ values. That is:

$$y_{ij}^t = 1 \text{ if } w_j^T c(x_i) + b_j \ge 0, \text{ and}$$

$$y_{ij}^t = 0, \text{ otherwise.}$$

where, in the label classification of the reconstructed examples, $y_{ij}^t=1$ means the j-th tag/label can be assigned to the i-th target domain example, a $y_{ij}^t=0$, means the j-th tag/label can not be assigned to it. Thus, by reconstruction, the examples in the target domain (e.g., tweets) may be re-represented. One reason for the reconstruction is that each tweet is very short. The reconstructing thus re-represents these tweets by analyzing some useful information from another rich source domain (source domain) so that the content of tweets can be enriched. Supervision is a terminology that refers to training a classifier with labeled examples. In an example provided, since the source domain examples are labeled ones, and some classifiers are trained by using these labels, then, it is called a supervised method.

By way of an example, the effectiveness of ALPOS as compared with other state of the art methods is now demonstrated. While the system and method of the embodiments described addressed a need to classify tweets—it is understood that a twitter dataset (used for the example) does not have human labels assigned to them. Hence two other datasets with ground truth are used to demonstrate the performance of the method. The method is used to classify tweets and give some example labels that may be assigned to the tweets. ALPOS is additionally used to identify hidden topics on a Twitter® dataset and report the results. The datasets are described in detail below and in Table I.

TABLE I

| | #Dimension | # Labels | Source Domain | | Target Domain | |
|---|---|---|---|---|---|---|
| | | | # Examples | Sparsity | # Examples | Sparsity |
| Synthetic Dataset | 9 | 3 | 2000 | 1 | 473 | 0.310 |
| Reuters21578 | 1029 | 57 | 10376 | 0.043 | 10305 | 0.003 |
| Twitter | 1416 | 566 | 12091 | 0.161 | 9995 | 0.004 |

EXAMPLE DATASET

A Synthetic Dataset: a synthetic dataset was created to demonstrate the ability of the method to learn from the partial observations through another set of related examples. This dataset is generated as follows. In the source domain, each example is associated with three randomly assigned binary labels. For each binary label, a 3-dimensional feature vector is generated for each example, according to a previously fixed gaussian distribution. In this way, for each example in the source domain, there is generated a 9-dimensional feature vector from six independent Gaussian distributions (For each label, two Gaussian distributions are designed: One is for the positive label, while the other one is for negative. Therefore, a total of six independent gaussian generators were needed.) In the target domain, the same method was used to generate the labels as well as the feature vectors. But, different from the source domain, for each generated example, approximately 60% percent of its features would be set to zero to mimic the partial observation problem for Twitter®. In this way, 2000 source domain, as well as 473 target domain examples were generated.

A Reuters-21578: This dataset included documents collected from the Reuters newswire in 1987 (See, for example, http://www.daviddlewis.com/resources/testcollections/reuters21578/.) There are in total 135 categories associated with 21578 documents in this dataset. Documents without any titles were removed. This dataset is further divided into two different sub-datasets. One contains the content part, while the other one contains the title part. The content part is used as the source domain and the title is considered as a partial observation of the target domain. To simulate the nature of Twitter®, some words in the titles are further randomly removed. In one example, the tf-idf (normalized term frequency and log inverse document frequency) features of the most frequently appearing words in the source domain are extracted for each instance and the stop words are removed from the features, and a porter used as the stemmer). The same vocabulary and word statistics are used for extracting feature vectors in the target domain. Furthermore, the source-domain examples with zero features and labels appearing less than 20 times, as well as the target domain examples without any features have been removed.

Twitter®: An exemplary dataset obtained from the current assignee, International Business Machines, Corporation (e.g., IBM). The source domain dataset included, for example, 12,091 webpages that were tagged by IBM employees using an internal social bookmarking tool. The term "IBM" was searched for in Twitter® and around 9,995 tweets collected over a period of time. These tweets were used as the target domain dataset. Since both the tweets and the webpages are related to IBM, it is fair to assume that these two domains share the same label space.

Method

For the proposed method, there are three parameters that are tuned, i.e., C1, C2 and $\beta$, as in Eq. (1). In one example embodiment, these may be set by five fold cross validation through the grid $2^{[i1:6]}$ for C1, C2, and [0:01:0:01:0:1] for $\beta$. 5 fold cross validation refers to implementing a technique that includes: dividing the training dataset (labeled dataset) into 5 equal size non-overlap sub-datasets. Each time, 4 datasets are used together as the source domain (training) example, and the other one as the target domain (unlabeled) example, then different values for parameters C1, C2, Beta are attempted (used), and the optimal C1, C2, Beta values corresponding to the highest classification accuracies on the target domain examples are recorded (The accuracy is measured by comparing the true labels of the target domain examples and the predicted ones given by the algorithm. Since there are in total 5 subdatasets, there is no need to do this for each subdataset once. Then, at least 5 optimal C1, C2, and Beta values are obtained. At last, the average values of these 5 optimal C1, C2, and Beta values and may be used as the optimal ones for use in the optimal input values for the experiments at hand.

As an example, the dimension of the hidden space is fixed to be 500 for Reuters21578 and Twitter dataset, and 20 for the synthetic dataset. The method of the embodiment described herein is compared with three different algorithms.

1. A Support Vector Machine (SVM), e.g., as described in B. Scholkopf and A. J. Smola entitled "*Learning with kernels.*" MIT press Cambridge, Mass., 2002, is a very popular large margin method that is widely used in many areas. This is not a transfer learning method and it assumes that the distributions for both the target and the source domain examples should be the same. In this paper, the trade-off parameter C for SVM is tuned through the grid $i$ . For the fairness of comparison, only the linear classifier is considered.

2. Large Margin Transductive Transfer Learning (LMTTL), e.g., as described in the reference to B. Quanz and J. Huan entitled "Large margin transductive transfer learning," *Proceeding of the* 18*th ACM conference on Information and knowledge management*, pages 1327-1336 ACM, 2009 is a recently proposed transfer learning method, which shows a good performance compared with the other state-of-art methods. It appears directed with the domain adaption problem when there are some labeled examples in the source domain as well as some unlabeled examples in the target domain, and assumes that the source domain examples and target domain examples are sampled from the same underlying marginal distribution. LMTTL tries to find this subspace by minimizing the maximum mean discrepancy (MMD) and the classification error simultaneously. In the experiment described herein by way of example, for each label in the label space, LMTTL will be trained once, and the acquired model would be specific for label. The trade-off parameter C for LMTTL is also tuned through the grid $i$ by using 5 fold cross validation. Again, for fairness of comparison, only the linear model is used. 3)

3. The performance of a Self Taught Learning (STL) technique, such as described in a reference to R. Raina, A. Battle, H. Lee, B. Packer, and A. Y. Ng entitled "Self-taught learning: transfer learning from unlabeled data" in *Proceedings of the* 24*th international conference on Machine learning*, page 766. ACM, 2007, is also reported here. In particular, STL may be used to learn the bases on the source domain, as well as the activation coefficients for all of the examples in the source and target domains. Then, an SVM is trained on these newly represented examples. Since STL does not use labels, the parameter $\beta$ is searched through the grid [0:001; 0:01; 0:1; 1; 10], and the trade off parameter C is set by 5-fold cross validation through the grid $i$ . The dimension of the hidden space is also fixed to be 500 for Reuters21578 and Twitter dataset, and 20 for synthetic dataset.

For the experiments, due to the problem of extremely class imbalance, on the synthetic dataset and Reuters, for each label, the same number of negative examples as positive ones is used for training. And for the experiments on Twitter®, the number of sampled negative examples is empirically chosen to be five times the size of the positive examples.

Evaluation Metric

To compare the performance of different methods, the average G-mean value, such as described in a reference to Y. Tang, Y. Q. Zhang, N. V. Chawla, and S. Krasser entitled "SVMs modeling for highly imbalanced classification" in *IEEE Transactions on Systems, Man, and Cybernetics, Part B*, 39(1):281-288, 2009), is used here which is a commonly used measurement in tasks, when the datasets are imbalanced, and is defined by $$G\text{-mean} = \sqrt{\frac{TP}{TP+FN} \times \frac{TN}{TN+FP}},$$

where TN, TP, FP, FN represent the numbers of True Negative, True Positive, False Positive, False Negative examples, respectively. It is the product of the prediction accuracies for both classes. Even if a model classifies the positive examples correctly, a poor performance in the classification of the negative examples will cause a low G-means value. The experiments are conducted in a multi-label classification setting, and therefore the average G-mean values across the different labels are reported. For comparison, the average true positive rate (tp rate), and average true negative rate (tn rate) across the multiple labels are also indicated.

Classification Results

The classification results on the example Synthetic dataset, Reuters-21578, and the Twitter dataset are now reported with the experimental results on the Synthetic dataset and Reuters-21578 reported in Table II.

TABLE II

| | Synthetic Dataset | | | Reuters21578 | | |
|---|---|---|---|---|---|---|
| | G-Mean | TP rate | TN rate | G-Mean | TP rate | TN rate |
| ALPOS | 0.710 | 0.862 | 0.615 | 0.830 | 0.861 | 0.819 |
| SYM | 0.627 | 0.869 | 0.540 | 0.792 | 0.833 | 0.767 |
| LMTIL | 0.608 | 0.805 | 0.522 | 0.782 | 0.842 | 0.749 |
| STL | 0.530 | 0.561 | 0.464 | 0.692 | 0.771 | 0.695 |

There is also provided a comparison of the performance of these different algorithms in these two different datasets, e.g., Synthetic Dataset 300 in FIG. 4A and Reuters21578 400 in FIG. 4B with varying number of source domain examples. More specifically, the number of source domain examples was varied from the whole domain corpus, and these extracted labeled examples were used in an attempt to improve the classification on the target domain examples. All the experimental results reported in these two datasets were averaged over several independent runs, e.g., 10 runs. Since there is no ground truth (i.e., true labels) for the Twitter® dataset, the classification results are reported for several randomly selected tweets as shown in a Table 500, shown in FIG. 5, and their top ranked tags with the largest softlabels are indicated.

It can be seen from Table II that the method employed in the ALPOS framework gives the best performance as the method, in one embodiment, finds an effective feature transform that serves as the bases for both the source domain and target domain examples, as well as maximize the performance of a set of classifiers. Further, it recovers the partial observed examples by using the learned bases in a more elegant way.

Further, although SVM is not a transfer learning algorithm, its performance is very competitive, compared to LMTTL and STL. In LMTTL, the basic idea is to find a feature transform that minimizes the distribution difference between two domains and at the same time maximizes the performance of the classifier. This works fine in the case where there are not many missing features in the target domain examples. However, in the experiments implemented in the example, since the target domain examples are just some partial observations, its distribution is quite different from that of the source domain.

In one aspect, the disclosure is able to take care of the missing features rather than minimizing the distribution differences. It can be seen from FIG. 4A that, in the synthetic dataset results 300, the performance of LMTTL method even decreases a little bit as shown at 310 when the number of source domain examples (ratio) is increased. This is because the basic assumption for LMTTL does not hold in the experiments, and giving more examples, may introduce more noise, which in one aspect, badly affects the final performance.

Further, the STL technique tries to learn a set of bases from the examples in the source domain through sparse coding which does not work in the present setting: 1) either because in STL, the authors assume that there is no labeled examples in the source domain (unlike the method in one embodiment where it is assumed that the label space for both the source and the target domains are the same and thus can learn a better set of bases than STL); and, 2) STL tries to recover all of the features of each target domain example by directly mapping them to the bases learned from the source domain example; however, this method becomes problematic when the Target domain examples are just some partial observations.

As can be further be seen from FIGS. 4A, 4B, the performance of SVM does not change much with the increase of the ratio in the synthetic dataset 300 (FIG. 4A); but it does increase in the Reuters-21578 dataset 400 results (FIG. 4B) as shown in the result at 410. This is because the synthetic dataset is a generated one, without many label overlaps. But for the Reuters dataset 400, the titles are believed to be actually good features for training the classifier, and with more source domain examples, the features that will decide the classifier will be more and more focused on the titles.

More particularly, Table 500 shown in FIG. 5 depicts example classification results on the example Twitter® dataset. It can be seen that a lot of the example tweets 501 can be explained using the tags 505. For example, for an example tweet 510 directed to an example job or position posting: "Hiring a Systems Administrator at IBM (Washington, D.C.) #jobs #shjobs", the tags 515 'find', 'expertise', 'firewall' and 'site' can be used to characterize the tweet 510.

Discovering Hidden Topics in Tweets

The clustering results on the Twitter® dataset are provided which is useful in uncovering the various topics in the tweets. After getting the new representations for the 9995 tweets by using ALPOS, they are grouped into 30 clusters by using well-known k-means clustering algorithm such as described in a reference to R. O. Duda, P. E. Hart, and D. G. Stork entitled *Pattern classification* Citeseer, 2001. Tags are assigned to each cluster by classifying the cluster centers. The clusters and corresponding tags for about 8 clusters are reported in a Table 600, as shown in FIG. 6. It can be observed from the table of FIG. 6 that the clustering is useful in identifying various conversations around the company (e.g., IBM). For example, software development is an important theme, with discussions centering around practitioner, solution and Agile® development methodology.

Thus, Experimental results on both synthetic dataset and Reuters-21578 demonstrate advantages of the ALPOS framework method over the other state-of-the-art methods. The results for an example Twitter dataset also demonstrate that the ALPOS framework method can identify meaningful hidden topics and provide useful classifications of specific tweets.

Figure 7:
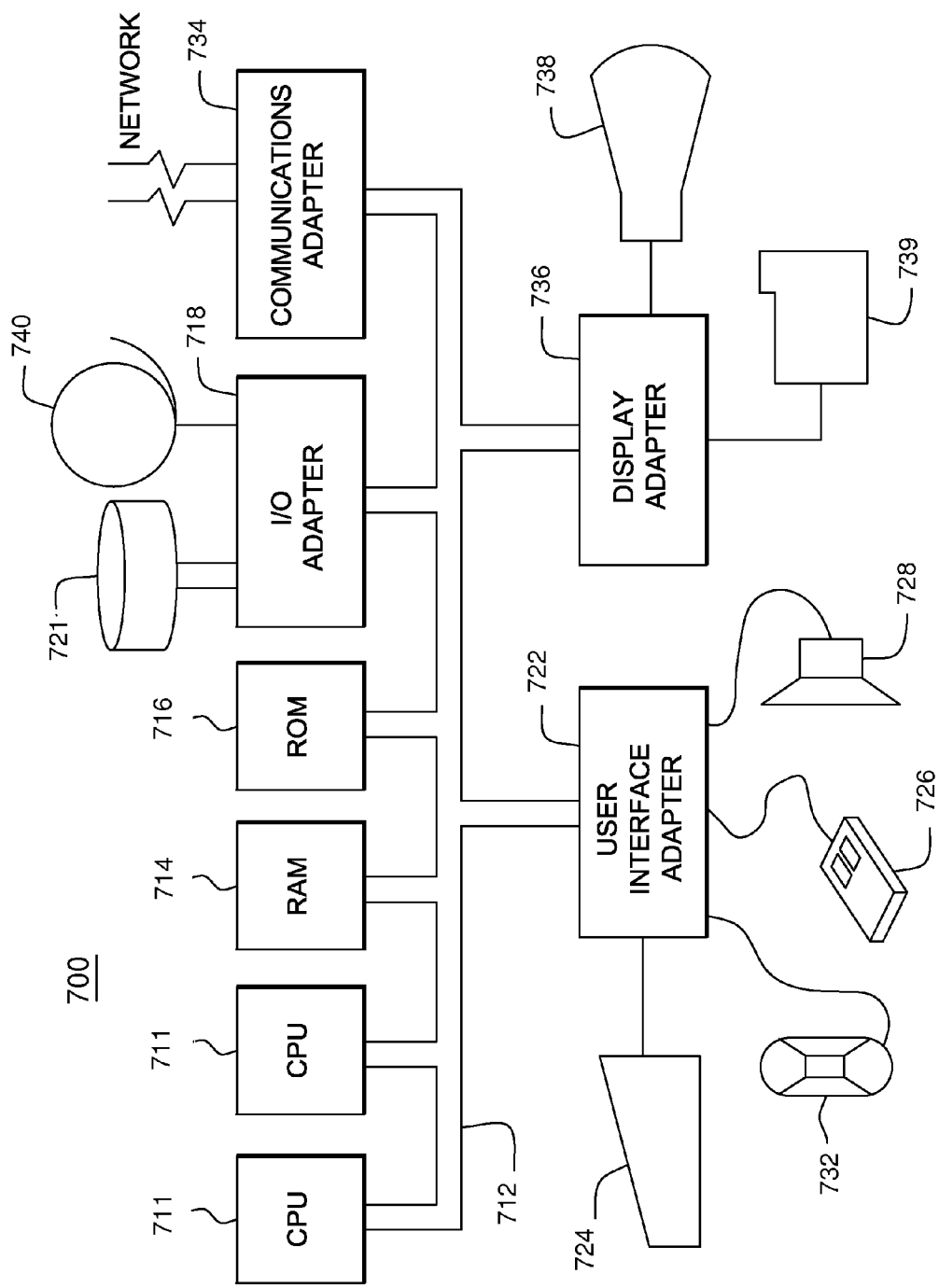

FIG. 7 illustrates an exemplary hardware configuration of a computing system 700 running and/or implementing the method steps described herein. The hardware configuration preferably has at least one processor or central processing unit (CPU) 711. The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting the system 700 to a data processing network, the Internet, an Intranet, a local area network (LAN), etc., and a display adapter 736 for connecting the bus 712 to a display device 738 and/or printer 739 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

Having thus described our invention, what we claim as new, and desire to secure by Letters Patent is:

1. A method for processing documents comprising:
constructing, via a programmed processor device, a hidden feature space from one or more text document examples of a source domain, said one or more text document examples tagged with one or more labels of a source domain label space; and,
simultaneously training one or more classifiers for use in classifying text documents, said classifiers trained on said one or more text document examples and said hidden feature space;
receiving, at said processor device, one or more abbreviated text document examples from a target domain;
reconstructing, at said processor device, said abbreviated text document examples of said target domain based on said constructed hidden feature space; and,
predicting the labels of said abbreviated text document examples based on the reconstructed target domain text document examples and said one or more trained classifiers.

2. The method as claimed in claim 1, wherein said trained one or more classifiers classify said partial observations text document examples into said label space determined from said source domain.

3. The method as claimed in claim 2, further comprising learning a classification model from said hidden feature space.

4. The method as claimed in claim 1, wherein said constructing comprises:
determining, from said source domain, a set of bases for reconstructing said abbreviated text document examples; and,
determining a set of classifiers for classifying said reconstructed abbreviated text document examples.

5. The method as claimed in claim 4, wherein said determining a set of bases comprises:
formulating an optimization problem to generate an optimized set of activation coefficients for representing feature vectors of said constructed hidden feature space that the one or more classifiers are directly trained or used in predicting said labels; and,
solving said problem to minimize a source domain text document reconstruction error while simultaneously minimizing an error in the learned classification model using said one or more tagged labels.

6. The method as claimed in claim 5, further comprising:
removing zero features of said abbreviated target-domain text document examples; and,
reconstructing non-zero features of each abbreviated text document example of said target domain.

7. The method as claimed in claim 6, wherein a feature represents a specific word, said learning further comprising:
extracting feature vectors in the target domain using identical vocabulary and word statistics used for extracting features in said source domain.

8. The method as claimed in claim 7, wherein said extracting includes extracting word features from source domain examples and said abbreviated target domain examples.

9. The method as claimed in claim 2, wherein said source domain includes multi-labeled text document examples, and said abbreviated target domain text documents include one or more of: a web page of limited character length, a mobile text message of limited character length, an instant message of limited character length, an online blog of limited character length, a tweet, a weblink, a paper abstract, and, a newsfeed.

10. The method as claimed in claim 9, wherein a source domain dataset includes one or more webpages tagged using a social bookmarking tool; and, said abbreviated target domain text documents of limited character length ranges from between 20-140 characters.

* * * * *